US006098779A

United States Patent [19]

Kubota

[11] Patent Number: 6,098,779
[45] Date of Patent: Aug. 8, 2000

[54] SLOPING TRANSPORTATION APPARATUS FOR CARRYING LARGE SIZED OBJECTS

[76] Inventor: Masao Kubota, 22-7, Narimasu 2-chome, Itabashi-ku, Tokyo, 175-0094, Japan

[21] Appl. No.: 09/341,525
[22] PCT Filed: Nov. 13, 1997
[86] PCT No.: PCT/JP98/05127
§ 371 Date: Aug. 2, 1999
§ 102(e) Date: Aug. 2, 1999
[87] PCT Pub. No.: WO99/25635
PCT Pub. Date: May 27, 1999

[30] Foreign Application Priority Data

Nov. 13, 1997 [JP] Japan .................................... 9-348437

[51] Int. Cl.[7] ..................................................... B65G 23/12
[52] U.S. Cl. ............................................................. 198/333
[58] Field of Search ...................................... 198/324, 333

[56] References Cited

FOREIGN PATENT DOCUMENTS 50-71085 10/1973 Japan .
51-102884 3/1975 Japan .
58-196359 12/1983 Japan .
3-95095 4/1991 Japan .
3-166192 7/1991 Japan .

*Primary Examiner*—James R. Bidwell
*Attorney, Agent, or Firm*—Staas & Halsey LLP

[57] ABSTRACT

A sloping transportation apparatus in which a step for carrying a large-sized object periodically appears without requiring any successive operation and which yet constitutes no hindrance to ordinary passengers' standing, ascent or descent. An enlarged step, of which the tread face has a run large enough to place a large-sized object such as a wheelchair thereon, is preceded and followed by at least one reduced step having a tread face with a reduced run (where ordinary steps have a run of 400 mm, 500 mm or 600 mm, the enlarged step is preceded and followed by three, two or one reduced step, respectively), to absorb the excess of the run of the enlarged step so that the steps may be equally joined in a horizontal straight traveling section. Also, a step structure for coupling each tread face to supporting rollers is provided. An auxiliary wheel is additionally provided to reinforce the support for the enlarged step, and the shape of a step guide surface is determined such that the steps do not interfere with peripheral parts in a turning section. The structure is applicable to an apparatus of the type in which the steps circulate in two ways with horizontal orientation of the tread faces thereof maintained throughout the entire traveling course. The enlarged tread face may have a recess formed therein as a wheel stopper for receiving the ground-touching portions of wheels.

4 Claims, 9 Drawing Sheets

SLOPING TRANSPORTATION APPARATUS FOR CARRYING LARGE SIZED OBJECTS

TECHNICAL FIELD

The present invention relates to a sloping transportation apparatus including an escalator, which has a step with an integral tread face permitting a large-sized object such as a wheelchair or large-sized baggage to be placed thereon and which is installed as a public passageway or in works to thereby contribute welfare and convenience.

BACKGROUND ART

Various types of escalators capable of carrying a large-sized object such as a wheelchair have already been developed and put to practical use. All of these types of escalators look like an ordinary escalator in appearance but are provided with mechanisms for transforming a special group of steps into a level surface when it is necessary to transport the large sized object and an attendant's help is necessary for operating the mechanism and placing the object. Accordingly, ordinary users are excluded and it is necessary that the traveling operation be suspended for a considerably long time, giving rise to a problem that ordinary users have to endure inconvenience. In addition, the escalators of the aforementioned types are generally complicated in structure and costly. Further, a rise of the wheelchair carrying step is twice or three times as large as that of an ordinary rise, thus impeding passengers' steps. There has also been proposed an escalator capable of carrying a large-sized object, in which separate tracks are provided individually for one or two additional steps added to an ordinary step so as to form a step for carrying a large-sized object and for an intermediate step intervening between an ordinary step and the additional step, thereby eliminating the need for the transformation mechanism. Because of an increased number of tracks, however, it is difficult to put this type of escalator into practical use. Meanwhile, a wheel stopper conventionally used is a retractable type.

DISCLOSURE OF INVENTION

The present invention provides a sloping transportation apparatus including an escalator, which is capable of carrying a large-sized object without requiring a complicated transformation mechanism unlike conventional escalators for carrying a wheelchair and without the need of a large number of separate tracks, simple in structure and can curtail the labor and time associated with operation.

Tracks employed in the invention, on which the steps travel, are similar to those to which steps of identical size are coupled, and at least one reduced step with a reduced run is connected before and behind an enlarged step having a single tread face permitting a large-sized object to be placed thereon. A step group have suitably varied shapes and dimensions, and no special manipulation is required substantially except for the operation of a wheel stopper mechanism. During traveling operation, the group of steps including the enlarged step capable of carrying a large-sized object such as a wheelchair on its single enlarged tread face appears periodically. Provided the ran of the enlarged step is A and the run of ordinary steps is AO, then an excess of the run of the enlarged step is A–AO. At least one adjacent step preceding and succeeding the enlarged step has a reduced run so that the steps may be equally joined in a horizontal traveling section. The reduced run is set not to cause a passenger any inconvenience, and the reduced steps should preferably be small in number. The aforementioned excess of the run of the enlarged step may be equally divided between the adjacent reduced steps preceding and succeeding the enlarged step, and in this case a reduction X of the run required of each reduced step is (A–AO)/2. For simplicity's sake, approximate numerical values will be given as respective dimensions in the following description. The following describes cases where the invention is applied to an escalator of conventional type in which steps are reversed during circulation and the run A of the enlarged step is set to 1200 mm so that a large-sized motorized wheelchair can be placed thereon.

(I): In the case where the run AO of the tread faces of ordinary steps is set to 400 mm.

The excess of the run of the enlarged step is 1200–400=800 mm, and accordingly, the required reduction of the run of the preceding and succeeding steps is 400 mm each. The required reduction of run may be divided in various ways, and one of the best methods will be to divide the required reduction into 150 mm, 100 mm and 150 mm such that adjacent three tread faces have runs of 250 mm, 300 mm and 250 mm, respectively. If the angle $\alpha$ of inclination of the escalator is 30°, rise $H = AO\sin\alpha = 400\times0.5 = 200$ mm, where AO=step pitch.

(II): In the case where the run AO of the tread faces of ordinary steps is set to 500 mm.

The excess of the run to be absorbed by each side of the enlarged step is (1200–500)/2=350 mm. This required reduction is divided equally between two adjacent runs, then the run of each reduced tread face is 500–350/2=325 mm, which is a dimension fit for practical use. If $\alpha$ is 30°, the rise H is 250 mm, which is thought to be within an allowable limit, and if $\alpha$=23°35', then H=200 mm.

(III): In the case where the run AO of the tread faces of ordinary steps is set to 600 mm.

The reduction of the run required of each side is (1200–600)/2=300 mm, and thus if one reduced tread face is provided on each side of the enlarged step, the run of each reduced tread face is 600–300=300 mm, ensuring a sufficiently practical use. If $\alpha$ is 30°, the rise H is 300 mm, which is somewhat too large; therefore, if $\alpha$ is set to 25°, H $600\times0.4226183 = 253.57$ mm, which generally falls within the allowable limit.

As seen from the above-described cases, it is possible to provide an escalator that does not cause passengers any inconvenience, but to attain this, consideration must be given to the following. First, the number of rollers for supporting the enlarged step with a large weight needs to be increased. Second, the escalator must be constructed such that interference of the steps is never caused under the floor in a turning section. To meet this requirement, a curved section with a radius of curvature considerably greater than the radius of a driving gear is provided between the horizontal traveling section and the driving gear, thereby preventing interference of the steps under the floor. Third, since the positions of the tread faces are shifted from the positions of corresponding supporting rollers, the structure of the steps needs to be determined such that the steps never interfere with each other and also have sufficient strength. Fourth, a wheel receiving recess is formed on the enlarged step so that it may serve as a manipulation-free wheel stopper.

By taking the above into consideration, it is possible to produce an escalator of which the tread face are properly joined in the horizontal traveling section and never undergo interference under the floor in the turning section and which also has sufficiently high supporting capability. Escalators can be classified into the conventional type in which the train of steps is reversed at the turning section and then travels on the hidden side of the escalator to return to the original position, and a type in which two ways, forward and backward, are constituted by a series of steps (an escalator whose tread faces maintain their horizontal orientation throughout the entire traveling course is an apt example). In the following, such escalators will be described in detail along with the structure and function of the manipulation-free wheel stopper.

BRIEF DESCRIPTION OF DRAWINGS

FIGS. 6*a* to 6*d* illustrate the relationship between lengthwise grooves of a tread face and a comb, wherein FIGS. 6*a* and 6*b* are a side view and a plan view of a fixed comb, respectively, FIG. 6*c* is a sectional view showing the grooves and the comb, and FIG. 6*d* is a side view of a movable comb;

BEST MODE OF CARRYING OUT THE INVENTION

Figure 1:
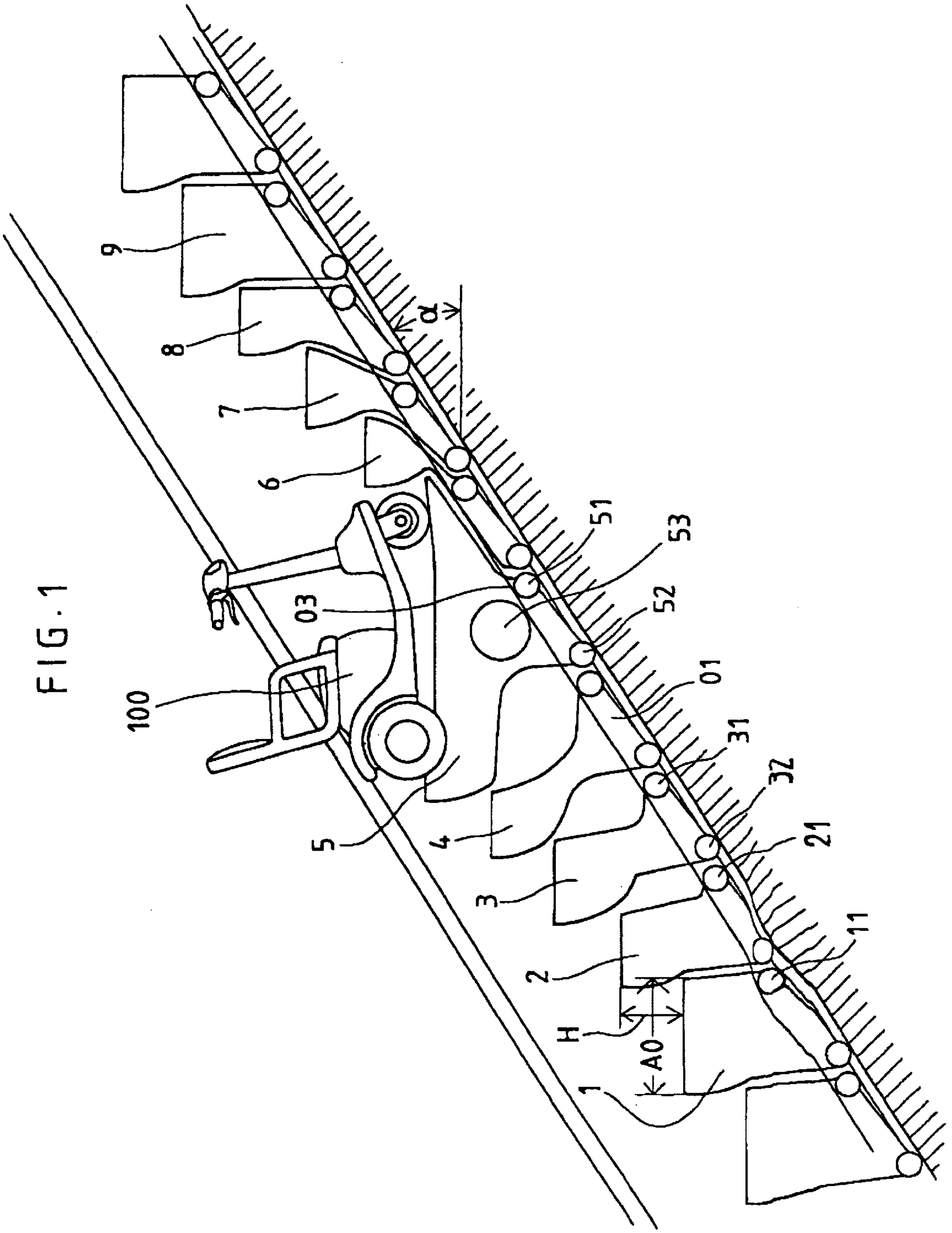
FIG. 1 is a side view of a sloping transportation apparatus of tread face reversal and circulation type of which the run of tread faces is set to 400 mm.

Various embodiments of the present invention will be described referring to the drawings. However, for those parts or elements which have no close relevance to the present invention, illustration and description thereof are omitted or only brief description will be made. Exemplary dimensions are expressed according to the metric system. In the case where a roller chain for vessels is used, however, since the dimensions of the chain are expressed using a basic unit of an inch (about 25.4 mm), "25 mm" should be understood to mean "25.4 mm" especially for dimensions of ran etc. of steps.

(1): In the case where the run AO of ordinary tread faces is set to 400 mm.

In a sloping straight traveling section, an enlarged step 5 capable of carrying a large-sized object such as a wheelchair 100 is situated between a lower group of steps 1, 2, 3 and 4 and an upper group of steps 6, 7, 8 and 9, both in ascending order, the steps 1 and 9 have a run of 400 mm, the steps 2, 4, 6 and 8 have a run of 250 mm, and the steps 3 and 7 have a run of 300 mm. The run 300 mm is large enough for a passenger to stand on the tread face, and the run 250 mm is large enough for a passenger to put his/her foot on the tread face when ascending or descending the steps. The positions of some tread faces are shifted from the positions of corresponding supporting rollers, and thus special measures need to be taken for the step structure. Namely, different structures are required depending on articulation and driving types.

(1a): In the case of conventional type escalator in which the tread faces are reversed during circulation.

To prevent part of the steps from interfering with each other, some steps connecting the respective tread faces to corresponding supporting rollers (step rollers and trailer rollers) have a sectional form such that part thereof is elongated and extends beneath another step, as shown in the side view of FIG. 1. When designing this type of escalator, therefore, special care needs to be given to the strength and the rigidity. To enable the enlarged step 5 to safely bear a large weight, an auxiliary wheel 53 with high load bearing capacity is provided on the roof of a guide groove associated with at least one of the step roller 51 and the trailer roller 52. FIG. 1 illustrates the case where the auxiliary wheel 53 is made to roll on a guide surface 03 of the roof of a guide groove 01 associated with the step roller 51 (the guide groove for the step rollers 11, 21, 31, . . . of the respective steps 1, 2, 3, . . . ).

Figure 2A:
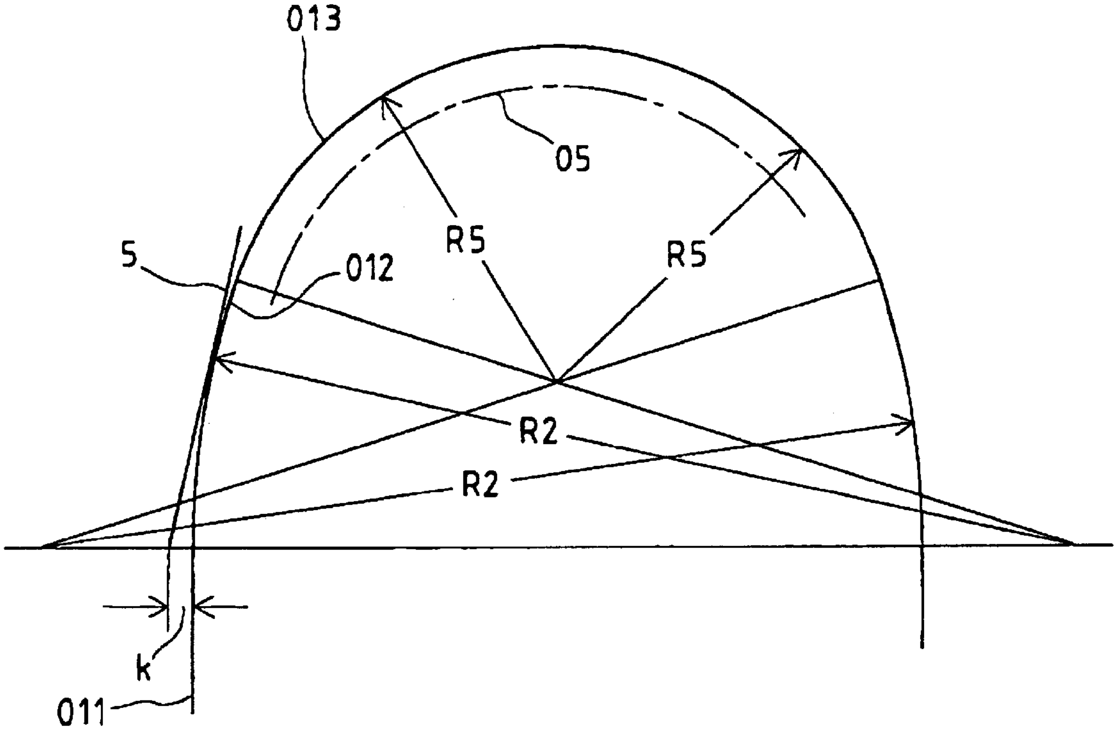
FIG. 2*a* is a side view showing a turning section with intervening arcs.
Figure 2B:
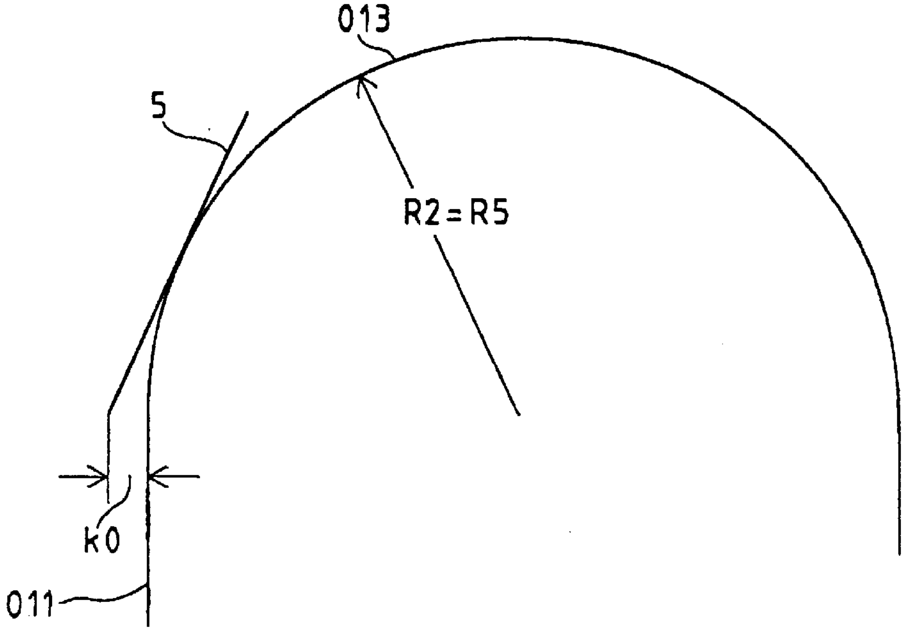
FIG. 2*b* is a side view showing a turning section with no intervening arcs.

Another problem to be solved is that the enlarged step 5 should not interfere with the underside of the floor or its peripheral parts at the turning section. As a means to solve the problem, as shown in the side view of FIG. 2*a*, curved portions with small curvature, for example, arcuate guide portions 012 having a radius R2 considerably greater than the radius R5 of a pitch circle of a chain gear 05, are made to intervene between a horizontal straight traveling section 011 of the step roller guide groove 01 and an arcuate portion 013 corresponding to the chain gear 05. FIG. 2*a* shows that, where R2=2.6R5, the amount k of projection of an end portion of the step 5 is smaller than the amount k0 of projection observed when no intervening guide portions with small curvature are provided as shown in FIG. 2*b*, whereby the interference of the step with the underside of the floor or its peripheral parts can be prevented.

(1b): In the case of escalator in which two ways, forward and backward, are coupled such that the tread faces maintain their horizontal orientation.

Figures 3A, 3B:
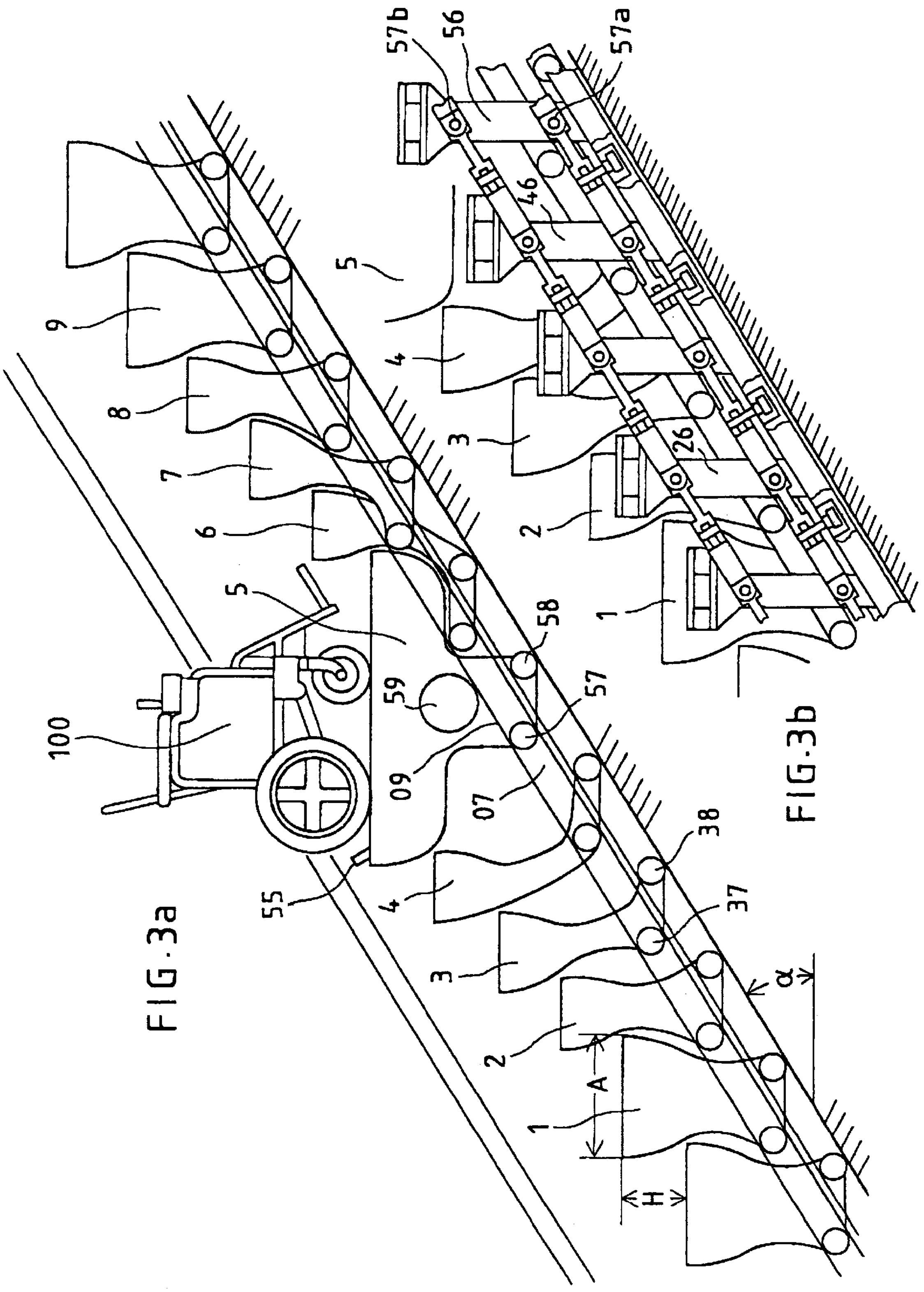
FIG. 3*a* is a side view showing external forms of steps of a sloping transportation apparatus of horizontal orientation maintenance and circulation type.
FIG. 3*b* is a side view showing part of steps equipped with a parallel link mechanism and a guiding mechanism.

The following describes a case where the present invention is applied to an invention (PCT/JP97/03613) with a principal construction wherein steps are articulated by means of a parallel link mechanism capable of flexing in the centers of coupling links, guide rollers provided on joint shafts of the flexing sections are guided, and the guide rollers constitute part of a driving mechanism at a turnaround section. As shown in FIG. 3*a*, the steps have a somewhat unusual sectional form so that adjacent steps can be prevented from interfering with each other, and in order that a similar articulated condition may be restored after the steps make a turn by 180°, the steps 4 and 6, the steps 3 and 7, and the steps 2 and 8 are individually symmetrical with each other and a structure shown in FIG. 3*b* is employed as an internal mechanism. A column 56, which extends downward from a moving handrail at a location below the step 5, is provided with lower and upper pin contacts 57*a* and 57*b* to be connected to parallel links, supporting rollers 57 and 58 are arranged symmetrically on front and rear sides of the lower pin, and an auxiliary wheel 59 is arranged (with its center located on the center line of the column 56) such that it rolls on a guide rail 09 provided on the roof of a guide groove 07 for the front supporting roller 57 (the guide groove for the front supporting rollers 17, 27, 37, . . . of the respective steps 1, 2, 3, . . . ). A supporting roller and an auxiliary wheel are provided also on the outside of the step. It should be noted that since the direction is reversed in the opposite way after a turn by 180°, the positions of the front and rear rollers are reversed.

Figure 4:
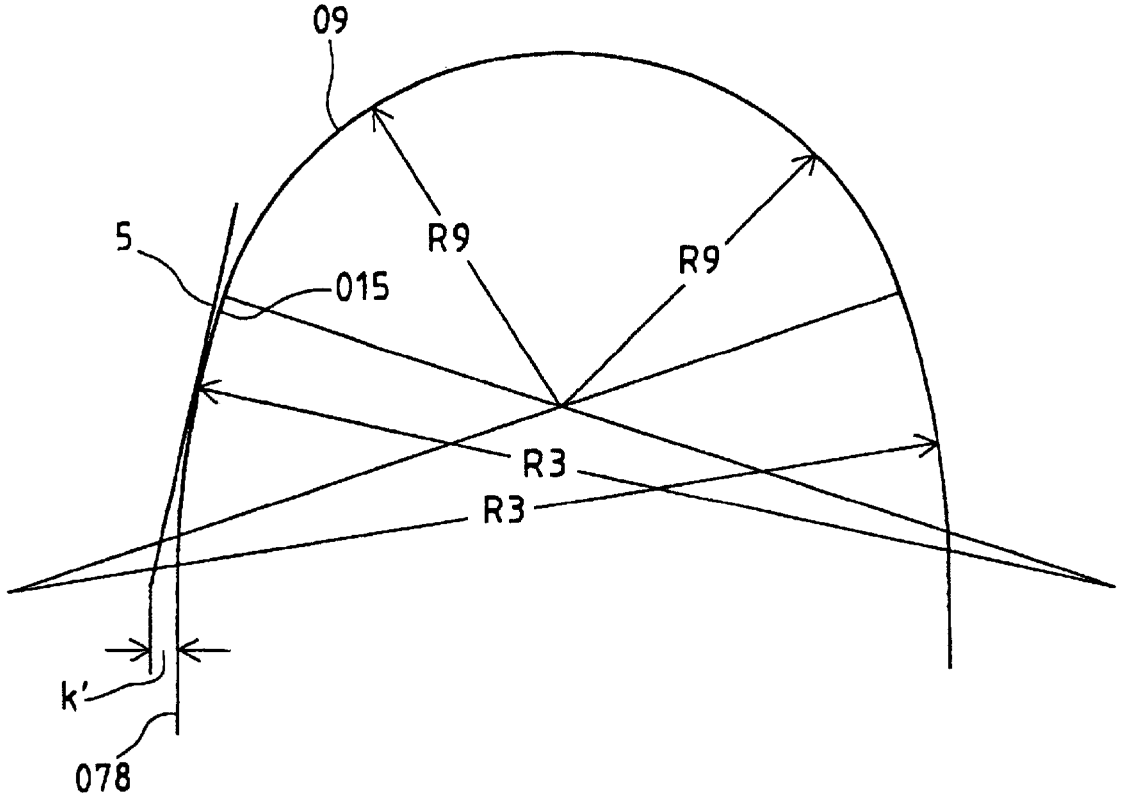
FIG. 4 is a plan view showing intervening curves at a turnaround section.

Thus, the horizontal orientation of the steps is secured doubly by the two guide grooves for the supporting rollers and the parallel link mechanism, and it is especially advantageous that the horizontal orientation of the enlarged step can be maintained. In order to prevent the enlarged step 5 from interfering with its peripheral wall surfaces, a guide surface 078 of the horizontal straight traveling section and a guide surface 09 (radius of turn: R9) of a gear-driven arcuate turnaround section are connected by curves with small curvature (in the example shown in the figure, arcs 015 with a radius R3), thereby to reduce the value of k' shown in FIG. 4.

(2): In the case where the run AO of ordinary tread faces is set to 500 mm.

Currently, the run AO of ordinary tread faces is set to 400 mm, but mainly because of an oppressive feeling that a passenger has when standing between passengers, the fact is that the utilization factor of the steps is as low as 50 to 75% even during the rush hours. If AO is set to 500 mm, passengers hardly feel oppressed; accordingly, the utilization factor improves and strangeness in shape of the steps adjacent to the enlarged step lessens. Where the angle a of inclination of the escalator is set to 30°, the rise H is 250 mm, which is somewhat too large; however, if α is set to 27°, then H is 227.0 mm, which falls within the practically allowable range. The following describes different articulation types.

(2a): In the case of chain-driven type escalator in which the steps return on the hidden side of the escalator.

Figure 7:
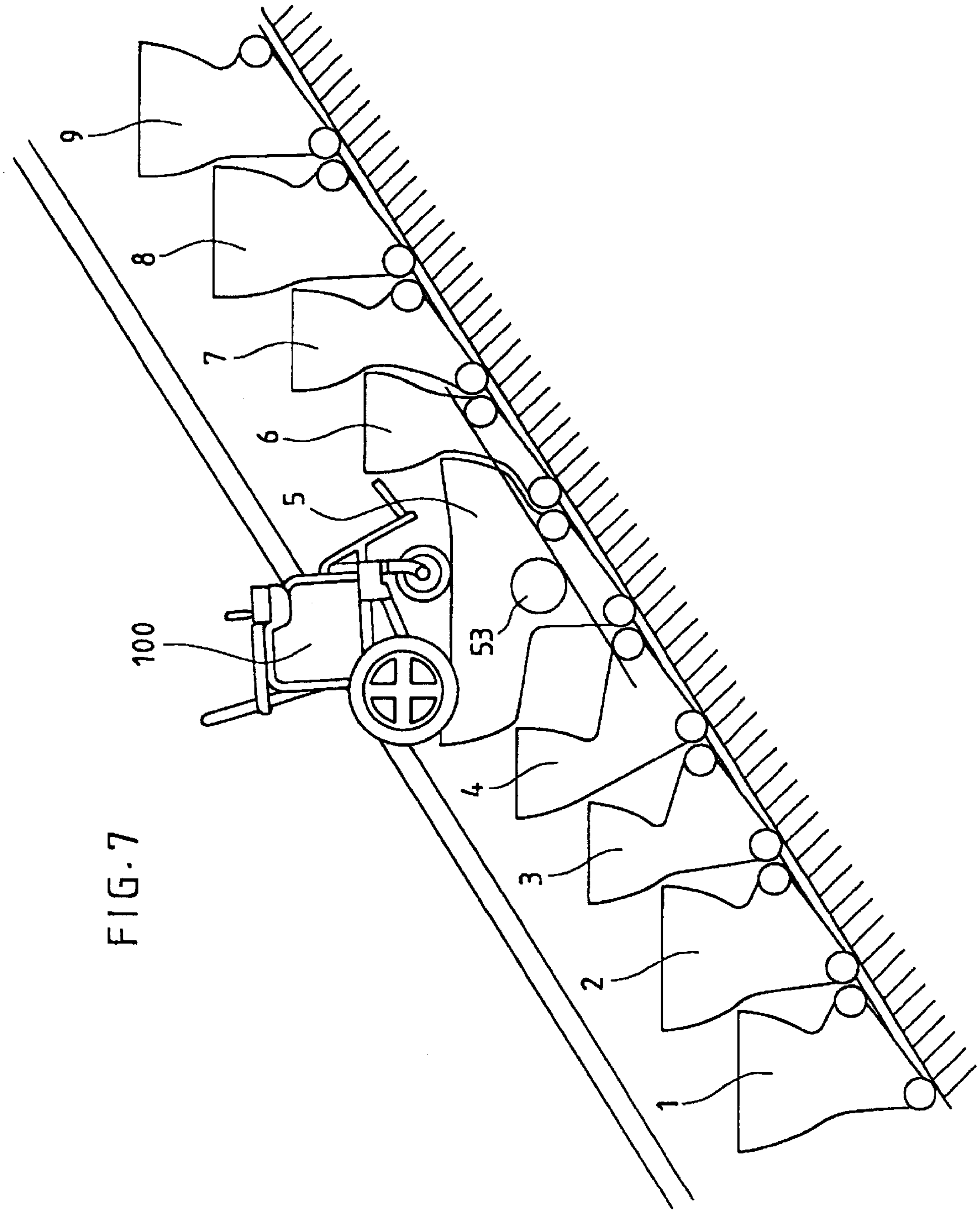
FIG. 7 is a side view of a sloping transportation apparatus of tread face reversal and circulation type of which the run of tread faces is set to 500 mm.

As shown in the side view of FIG. 7, the steps have relatively moderate sectional forms. The auxiliary wheel and the turning section are basically identical in shape with those described in (1a) above.

Figure 8:
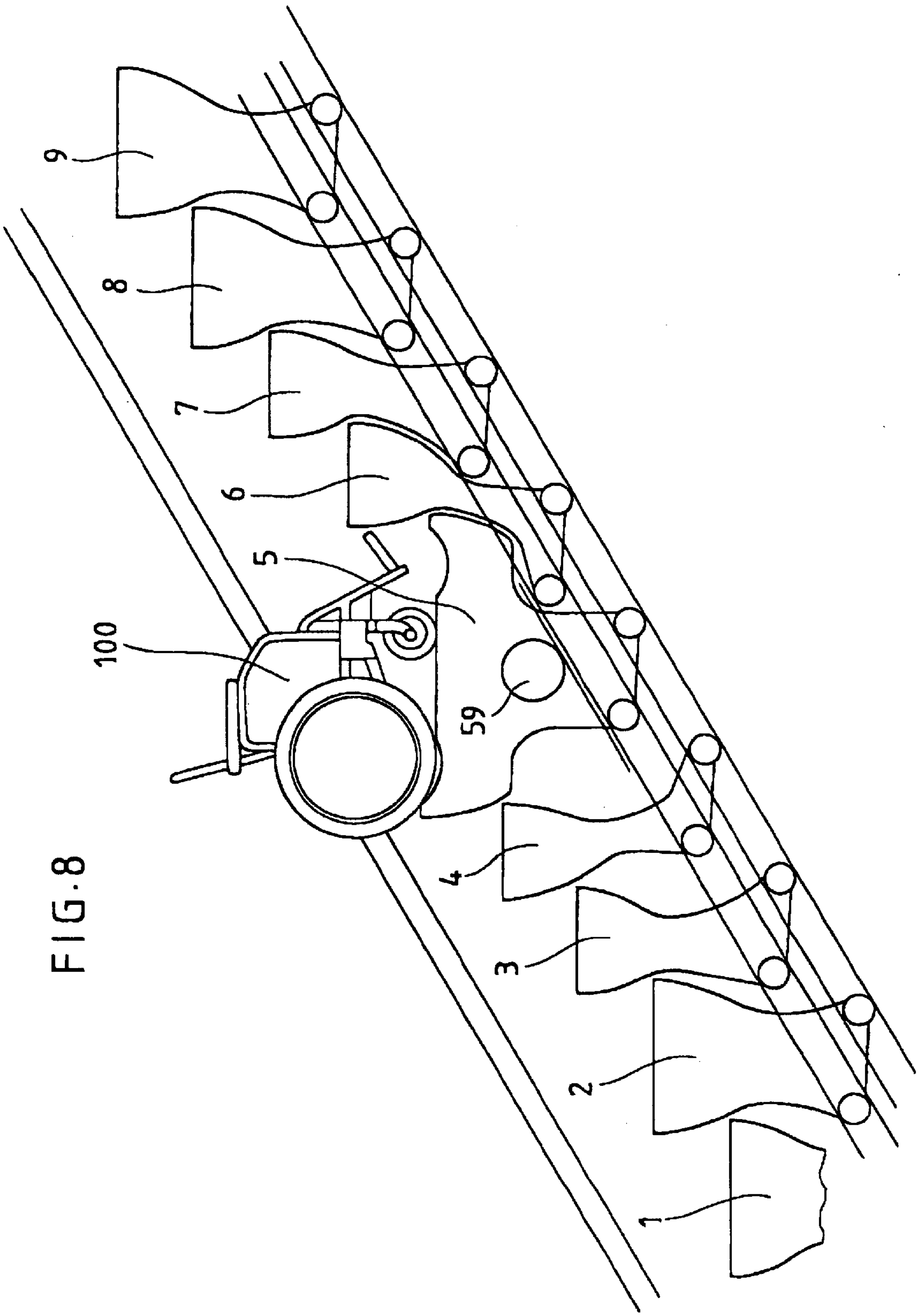
FIG. 8 is a side view of a sloping transportation apparatus of horizontal orientation maintenance and circulation type of which the run of tread faces is set to 500 mm.

(2b): In the case of escalator of the type in which two ways, forward and backward, are coupled such that the tread faces maintain their horizontal orientation.

Where the steps are basically identical in structure with those described in (1b) above, their strangeness in sectional form lessens as shown in the side view of FIG. 8. The auxiliary wheels and the guide surface of the turnaround section are basically identical in structure etc. with those described in (1b).

(3): In the case where the run AO of ordinary tread faces is set to 600 mm.

In an airport etc., many passengers carry baggage with them and seldom ascend or descend escalators. Thus, even if AO=600 mm and α=30°, the resulting rise H of 300 mm does not constitute a particular hindrance. Since only one reduced step may be provided before and behind the enlarged step, the structure is simplified and also the sectional forms of the enlarged step 5 and its adjacent steps can be simplified. The following describes different articulation types.

(3a): In the case of chain-driven type escalator in which the steps return on the hidden side of the escalator.

Figure 9:
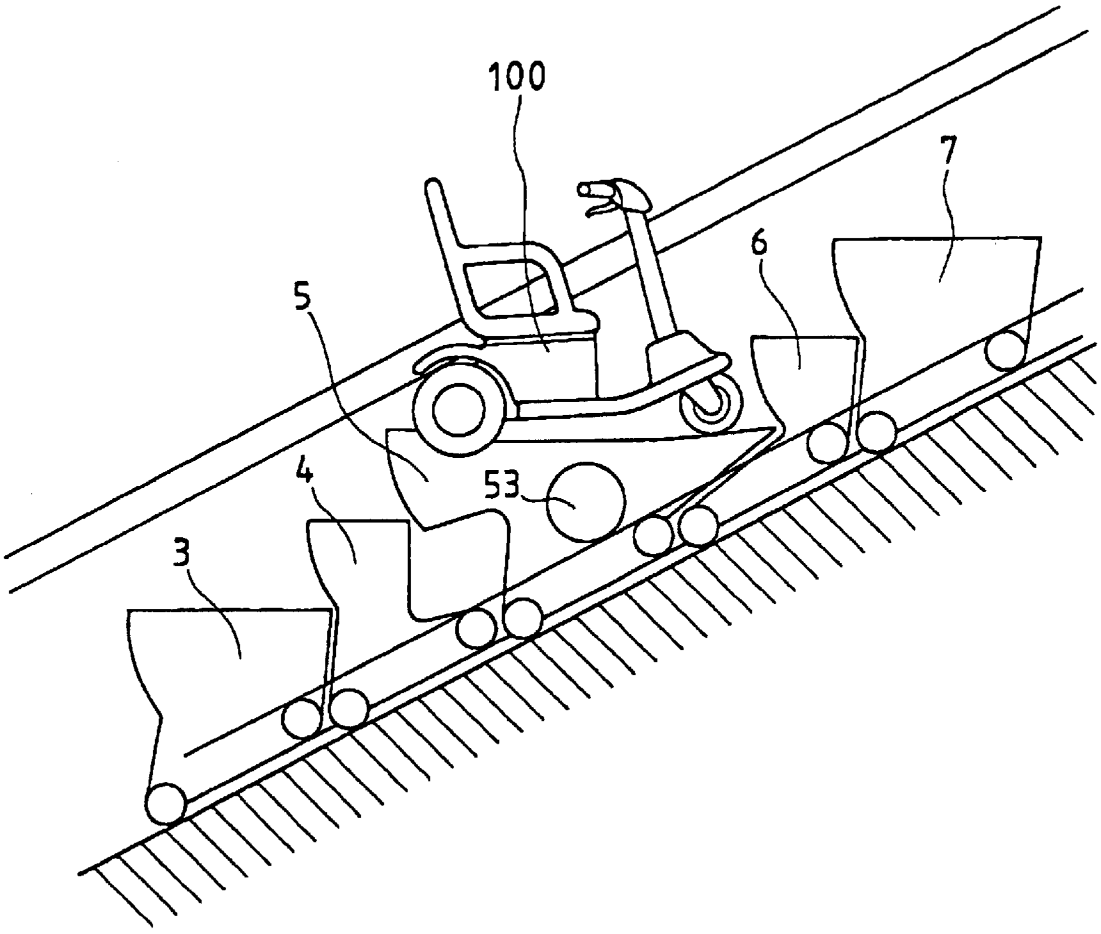
FIG. 9 is a side view of a sloping transportation apparatus of tread face reversal and circulation type of which the run of tread faces is set to 600 mm.

A train of steps including the enlarged step 5 in the middle has a sectional form as shown in FIG. 9. The auxiliary wheel and the turning section are basically identical with those described in (1a) and (2a) above.

(3b): In the case of escalator of the type in which two ways, forward and backward, are coupled such that the tread faces maintain their horizontal orientation.

Figure 10:
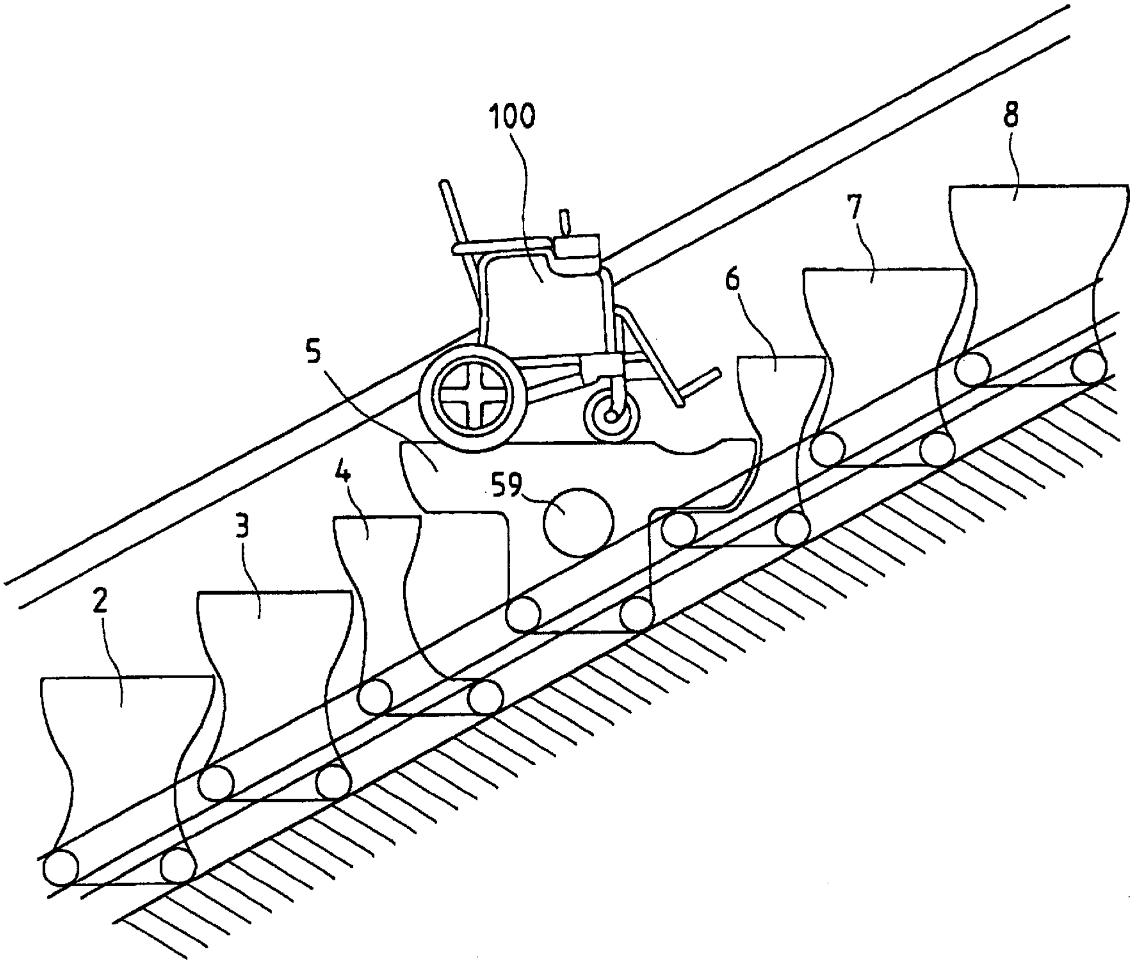
FIG. 10 is a side view of a sloping transportation apparatus of horizontal orientation maintenance and circulation type of which the run of tread faces is set to 600 mm.

A train of steps including the enlarged step in the middle has a sectional form as shown in FIG. 10. The auxiliary wheels and the guide surface of the turnaround section are basically identical with those described in (1b) and (2b) above.

Figure 5A:
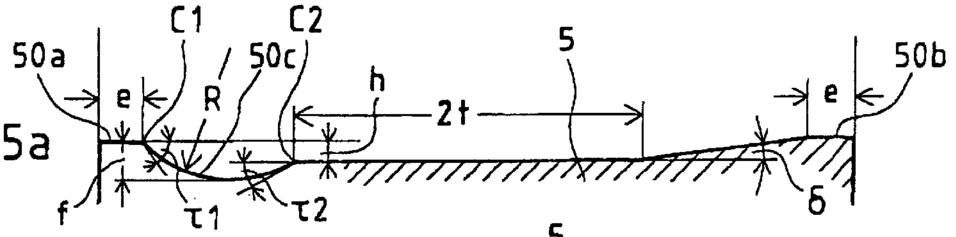
FIG. 5*a* is a side view showing an arcuate recess formed as a wheel stopper on an enlarged tread face of a transportation apparatus of tread face reversal and circulation type.
Figure 5B:
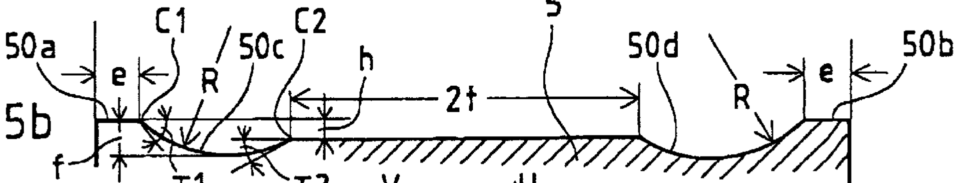
FIG. 5*b* is a side view showing arcuate recesses as a wheel stopper of a transportation apparatus of horizontal orientation maintenance and circulation type.
Figure 5C:
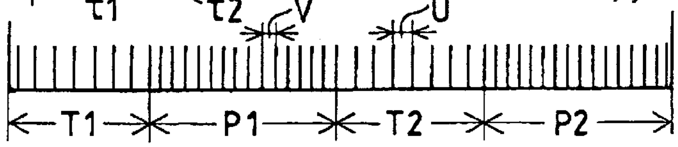
FIG. 5*c* is a plan view of a recess type wheel stopper.

(4) Wheel stopper function:

An escalator for carrying a wheelchair is provided with a wheel stopper mechanism 55 (FIG. 3*a*), which is retracted when not in use and is pulled out when a wheelchair is placed on the escalator, to prevent the wheelchair from falling. To make the mechanism entirely manipulation-free, a different method needs to be adopted. As a novel method, a recess is formed on the enlarged tread face for receiving the ground-touching portions of at least the front or rear wheels of a wheelchair. FIGS. 5*a* to 5*c* show different structures to cope with various types and dimensions of wheelchairs. FIG. 5*a* is a side view of a structure for use with the conventional chain-driven type, and FIG. 5*b* is a side view of a structure for use with the horizontal orientation maintenance and circulation type.

In the case of FIG. 5*a*, the recess is formed near and edge of the riser, but in the case of FIG. 5*b*, the recess needs to be formed both on front and rear sides, because the position of the riser is revered in forward and backward ways. The case of FIG. 5*a* will be explained along with exemplary numerical values given as individual dimensions of the enlarged tread face. A horizontal portion 50*a* extends from the riser edge for a run e (70 mm), and an arcuate portion 50*c* having a radius R (=200 mm) and a depression f (=60 mm) from the horizontal plane adjoins the horizontal portion 50*a*. The arcuate portion 50*c* and a horizontal portion with a run e (mm) at the deepest end are connected by a central horizontal portion which has a depression h (33 mm) (the reason will be explained with reference to the case of FIG. 5*b*) and which has an inclined flat surface (with lengthwise grooves) inclined at an angle δ(=15°).

In the case of FIG. 5*b*, arcuate portions are formed on front and rear end portions, respectively, so as to be symmetrical with respect to a horizontal center line on the tread face. Specifically, horizontal portions 50*a* and 50*b* each with a run e (=70 mm) are formed at the front and rear end portions of the enlarged tread face 5, and arcuate portions 50*c* and 50*d* with a radius R (=200 mm) and a depression f (=60 mm) from the horizontal plane adjoin the respective horizontal portions. A horizontal portion with a run of 2t is left in the central portion of the enlarged tread face 5, and if the central horizontal portion is depressed by h (=33 mm) in order to mitigate the inclination of the wheelchair whose front or rear wheels are not received in recess then the run 2t of the central horizontal portion equals 573.59 mm because $$t = A/2 - e - \sqrt{(2R-f)f} - \sqrt{(2R-f+h)(f-h)} = 600 - 70 - \sqrt{340\times 60} - \sqrt{373\times 27} = 286.297\text{mm}.$$

Provided the points of intersection of the arc with the end portion and the central horizontal portion of the tread face are C1 and C2, respectively, and the tangential angles of the arc at these points are $\tau 1$ and $\tau 2$, then $\tau 1 = arccos((R-f)/R) = 45°34'$, $\tan\tau 1 = 1.0200$ (=coefficient of static friction), $\tau 2 = arccos((R-f+h)/R) = 30°07'$, and $\tan\tau 2 = 0.5801$ (=coefficient of static friction).

The coefficient of static friction between the wheelchair tire and the tread face is 0.6 to 1.0 at most. Accordingly, where the tire diameter is 400 mm or less, the tire received in the recess is braked and never falls but yet can be moved beyond C2, and where the tire diameter exceeds 400 mm, the tire can be placed stably between C1 and C2 (slightly chamfered). The wheel stopper need not be formed over the entire lateral width but may be provided only in regions where the main tires pass, and this is convenient also for ordinary passengers. The example shown in FIG. 5*c* has a tire region T1(=225 mm), a passenger region P1(=300 mm), a tire region T2(=225 mm) and a passenger region P2(=300 mm). Thus, the tire region (=300 to 750 mm, left-hand region =right-hand region =525 mm, and accordingly, there is no hindrance to the placement of various types of wheelchairs or to the passengers' riding, ascent and descent.

(5) Lengthwise grooves of the tread face and a comb.

Figure 6A:
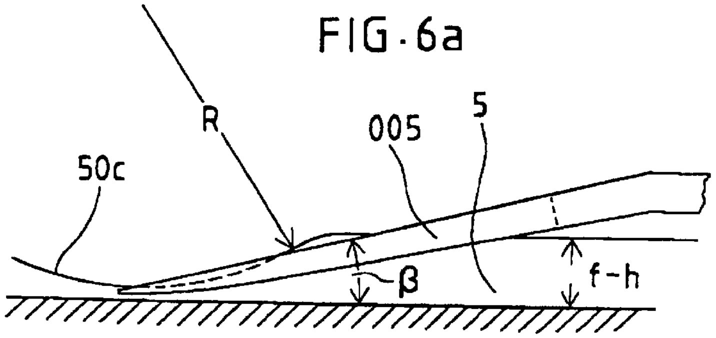
Figure 6C:
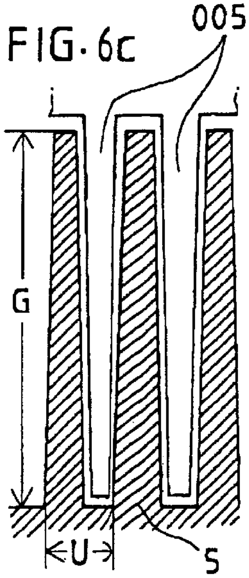
Figure 6B:
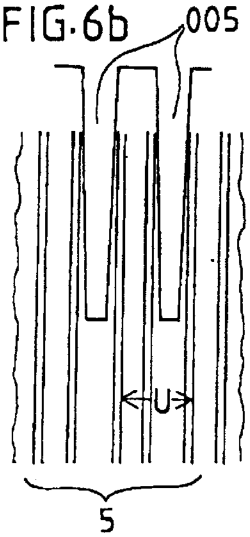
Figure 6D:
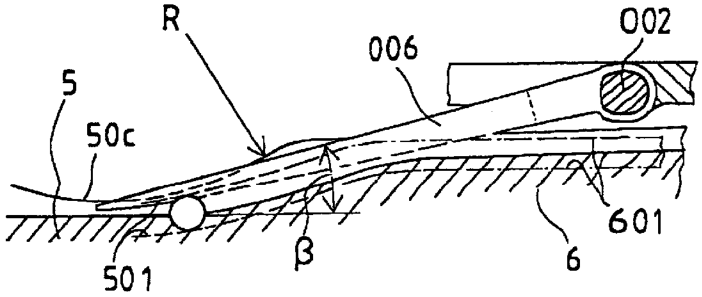

For the recessed regions (regions T1, T2) formed on the enlarged tread face as the wheel stopper, deep grooves are formed over the entire tread face, and a comb for engagement with the grooves has an elongated shape with a large height, as shown in FIGS. 6*a* to 6*c*. In order to ensure sufficient strength, a pitch U is set to be greater than a pitch V (see FIG. 5*c* ) for the-passenger regions P1 and P2. In the case of the exemplary dimensions set forth in (4) above, an angle β of inclination of a comb 005 is set at 15° corresponding to a design limit, and a depth or height G of the grooves is set to about 62 mm, taking account of the thickness and spacing of distal tooth portions of the comb. In cases where the depth of the grooves on ordinary tread faces should be kept small, a movable comb 006 shown in FIG. 6*d* may be used, wherein the comb 006 is swingably supported on a horizontal shaft 002 parallel with a floor surface 00, and comb guide rollers 003 located at the distal tooth portion of the comb 006 are guided along comb tooth guide surfaces 401, 501, 601, etc. (partly omitted in the figure) of the steps 4, 5, 6, etc.; however, this method requires complicated structure and cannot be said practical.

(6) Operation:

Unlike conventional escalators, the present invention does not require a mechanism for transforming the escalator so as to carry a wheelchair, and therefore, except for the switch operation before a wheelchair is placed, the switch operation for the wheel stopper (this is unnecessary in the case of the recess type wheel stopper) after the escalator is stopped at a predetermined position, and the switch operation for starting, no other manipulations are required such as confirmation of a preliminary mechanism for the transformation, confirmation of the results of the transformation, and the restoration after use, whereby the cost and time can be saved, safety can be improved, and attendance of the operator may itself be unnecessary as the case may be. In the transformation type, the rise at the wheelchair carrying section is twice or three times as large as the normal height, constituting a hindrance to passengers' ascent or descent. However, in the present invention, the rise may somewhat increase but does not constitute a hindrance. In cases where most passengers carry baggage with them and do not desire to ascend or descend steps, the magnitude of the rise does not cause any problem. Also, an enlarged step can be easily provided in a plurality of regions of an escalator, thus shortening the users' waiting time. Existing transformation type escalators are usually provided with a single enlarged step to prevent the structure from becoming complicated, and this results in an increase in the waiting time. According to the present invention, in the case where a plurality of enlarged steps are arranged at equal intervals, control operation is performed such that upon depression of a button, a proximity switch sensor closest to an arriving wheelchair is set operative, followed by reduction in speed and then stop of the escalator.

According to the present invention, the enlarged step capable of carrying a large-sized object such as a wheelchair automatically and periodically appears without requiring special operation, and a large-sized object such as a wheelchair can be carried even in a perfectly manipulation-free fashion. Also, the reduced steps do not hinder ordinary passengers' standing or ascent or descent.

What is claimed is:

1. A sloping transportation apparatus for carrying a large-sized object, in which a plurality of steps are connected to travel forward and backward so that tread faces of the individual steps are kept horizontal at least in a load carrying section, said apparatus comprising:

a plurality of ordinary steps;

at least one enlarged step having a tread face with a run greater than that of said ordinary steps and permitting a large-sized object to be placed thereon; and at least one reduced step having tread face with a run smaller than that of said ordinary steps and connected adjacent to said enlarged step before and behind said enlarged step, the tread face of said reduced step being shifted in position from the tread faces of said ordinary steps in a sloping traveling section;

wherein positions of all of the steps are determined such that the tread faces thereof are properly located adjacent to each other on an identical plane in a horizontal traveling section, and curvature of a guide surface connecting a horizontal traveling guide surface and a pitch surface of a step driving mechanism is determined such that said enlarged step does not interfere with a wall surface under floor in a turning section.

2. A sloping transportation apparatus according to claim 1, wherein a train of the steps circulates such that the steps travel on a reverse side after passing the turning section and return to an original position.

3. A sloping transportation apparatus according to claim 1, wherein each of the steps circulates in two ways with horizontal orientation of the tread face thereof maintained throughout an entire traveling course, each of the steps being connected to a parallel link mechanism flexible at centers of coupling links and guided by guide rollers provided on joint shafts of flexing sections.

4. A sloping transportation apparatus according to any one of claim 1, wherein the tread face of said enlarged step has a recess formed therein for receiving ground-touching portions of wheels of a wheelchair.

* * * * *

UNITED STATES PATENT AND TRADEMARK OFFICE

CERTIFICATE OF CORRECTION

PATENT NO. : 6,098,779

DATED : August 8, 2000

INVENTOR(S) : Masao KUBOTA

It is certified that error appears in the above-identified patent and that said Letters Patent is hereby corrected as shown below:

Title Page [54] change "LARGE SIZED" TO --LARGE-SIZED--.

Col. 1, line 2, change "LARGE SIZED" TO --LARGE-SIZED--.
line 61, change "AO" to --A0--;
line 62, change "AO" to --A0--.

Col. 2, line 4, change "AO" to --A0--;
line 12, change "AO" to --A0--;
line 22, change "AO" to --A0--;
line 23, change "AO" to --A0--;
line 24, change "AO" to --A0--;
line 34, change "AO" to --A0--.

Col. 3, line 66, change "ran" to --run--.

Col. 4, line 1, change "AO" to --A0--.

Col. 5, line 30, change "AO" to --A0--;
line 32, change "AO" to --A0--;
line 36, change "AO" to --A0--;
line 39, change "a" to --α--;
line 61, change "AO" to --A0--;
line 65, change "AO" to --A0--.

Col. 6, line 67, after "recess" insert --,--.

Signed and Sealed this

Twenty-fourth Day of April, 2001

*Attest:*

Nicholas P. Godici

NICHOLAS P. GODICI

*Attesting Officer* *Acting Director of the United States Patent and Trademark Office*